United States Patent
Busko et al.

(10) Patent No.: US 11,421,154 B2
(45) Date of Patent: Aug. 23, 2022

(54) COMPOSITION WITH ENHANCED LUMINESCENCE

(71) Applicant: Karlsruher Institut für Technologie, Karlsruhe (DE)

(72) Inventors: Dmitry Busko, Bruchsal (DE); Guojun Gao, Stutensee (DE); Ian Howard, Karlsruhe (DE); Bryce Richards, Stutensee-Blankenloch (DE); Andrey Turshatov, Griesheim (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 1066 days.

(21) Appl. No.: 16/038,588

(22) Filed: Jul. 18, 2018

(65) Prior Publication Data

US 2019/0022706 A1 Jan. 24, 2019

(30) Foreign Application Priority Data

Jul. 21, 2017 (EP) ..................................... 17001253

(51) Int. Cl.
| | |
|---|---|
| C09K 11/77 | (2006.01) |
| B07C 5/342 | (2006.01) |
| B41M 1/04 | (2006.01) |
| B07C 5/36 | (2006.01) |
| G01N 21/85 | (2006.01) |

(52) U.S. Cl.
CPC .......... C09K 11/7773 (2013.01); B07C 5/342 (2013.01); B07C 5/362 (2013.01); B07C 5/367 (2013.01); B41M 1/04 (2013.01); C09K 11/777 (2013.01); C09K 11/7788 (2013.01); G01N 21/85 (2013.01)

(58) Field of Classification Search
CPC .............. C09K 11/777; C09K 11/7769; C09K 11/7788; C09K 11/773
See application file for complete search history.

(56) References Cited

U.S. PATENT DOCUMENTS

| | | | |
|---|---|---|---|
| 2011/0024648 A1* | 2/2011 | Cheetham | .......... C09K 11/7768 250/459.1 |
| 2013/0043406 A1* | 2/2013 | Huignard | .................. C03C 8/14 252/587 |

OTHER PUBLICATIONS

Arvanitoyannis, I.S., et al., "Recycling of Polymeric Materials Used for Food Packaging: Current Status and Perspectives", Food Rev. Int., 2001, vol. 17(3), pp. 291-346, https://doi.org/10.1081/FRI-100104703.

Boyer, J.-C., et al., "Absolute Quantum Yield Measurements of Colloidal NaYF4: Er3+, Yb3+ Upconverting Nanoparticles", Nanoscale, Aug. 2010, vol. 2(8), pp. 1417-1419, doi:10.1039/c0nr00253d, Epub May 29, 2010.

Etchart, I., et al., "Oxide Phosphors for Efficient Light Upconversion: Yb3+ and Er3+ co-doped Ln2BaZnO5 (Ln=Y, Gd)", J. Mater. Chem., 2010, vol. 20(19), pp. 3989-3994, doi:10.1039/C000127A.

(Continued)

*Primary Examiner* — Matthew E. Hoban
(74) *Attorney, Agent, or Firm* — McDonnell Boehnen Hulbert & Berghoff LLP

(57) ABSTRACT

A composition for photoluminescence of the chemical formula $M_{2(1-y-z)}Yb_{2y}Rem_{2z}ADO_{5-x}F_{2x}$, a method for producing said composition, and uses of said composition are provided.

13 Claims, 6 Drawing Sheets

(56) References Cited

OTHER PUBLICATIONS

Etchart, I., et al., "Efficient White Light Emission by Upconversion in Yb3+-, Er3+- and Tm3+-doped Y2BaZnO5", Chem. Commun., 2011, vol. 47(22), pp. 6263-6265, doi:10.1039/C1CC11427A.
Florestan, J., et al., "Recycling of Plastics: Automatic Identification of Polymers by Spectroscopic Methods", Resources, Conservation and Recycling, Apr. 1994, vol. 10(1-2), pp. 67-74, https://doi.org/10.1016/0921-3449(94)90039-6.
Haferkamp, H., et al., "Laser-Aided Material Identification for the Waste Sorting Process", Proceedings, SPIE 2092, Substance Detection Systems, Mar. 28, 1994, p. 328, doi:10.1117/12.171252.
Park, C.-H., et al., "PVC Removal from Mixed Plastics by Triboelectrostatic Separation", J. Hazard. Mater., Jun. 1, 2007, vol. 144(1-2), pp. 470-476, https://doi.org/10.1016/j.jhazmat.2006.10.060.
Pokhrel, M., et al., "High Upconversion Quantum Yield at Low Pump Threshold in Er3+/Yb3+ Doped La2O2S Phosphor", Mater. Lett., May 15, 2013, vol. 99, pp. 86-89, https://doi.org/10.1016/j.matlet.2013.02.062.
Pokhrel, M., et al., "Highly Efficient NIR to NIR and VIS Upconversion in Er3+ and Yb3+ Doped in M2O2S (M=Gd, La, Y)", J. Mater. Chem. A, 2013, vol. 1(38), pp. 11595-11606, doi:10.1039/C3TA12205K.
Scott, D.M., "A Two-Colour Near-Infrared Sensor for Sorting Recycled Plastic Waste", Meas. Sci. and Technol., 1995, vol. 6, p. 156, https://doi.org/10.1088/0957-0233/6/2/004.
Arvanitoyannis, I.S., et al., "Recycling of Polymeric Materials Used for Food Packaging: Current Status and Perspectives", Food Rev. Int., 2001, vol. 17(3), pp. 291-346, https://doi.org/10.1081/FRI-100104703. (Abstract only).
Boyer, J.-C., et al., "Absolute Quantum Yield Measurements of Colloidal NaYF4: Er3+, Yb3+ Upconverting Nanoparticles", Nanoscale, Aug. 2010, vol. 2(8), pp. 1417-1419, doi:10.1039/c0nr00253d, Epub May 29, 2010. (Abstract only).
Etchart, I., et al., "Oxide Phosphors for Efficient Light Upconversion: Yb3+ and Er3+ co-doped Ln2BaZnO5 (Ln=Y, Gd)", J. Mater. Chem., 2010, vol. 20(19), pp. 3989-3994, doi:10.1039/C000127A. (Abstract only).
Etchart, I., et al., "Efficient White Light Emission by Upconversion in Yb3+-, Er3+- and Tm3+-doped Y2BaZnO5", Chem. Commun., 2011, vol. 47(22), pp. 6263-6265, doi:10.1039/C1CC11427A. (Abstract only).
Fisher, M.M., et al., "Plastics Recycling", Plastics and the Environment, John Wiley & Sons, Inc., 2005, Chapter 14, https://doi.org/10.1002/0471721557.ch14. (Abstract only).
Florestan, J., et al., "Recycling of Plastics: Automatic Identification of Polymers by Spectroscopic Methods", Resources, Conservation and Recycling, Apr. 1994, vol. 10(1-2), pp. 67-74, https://doi.org/10.1016/0921-3449(94)90039-6. (Abstract only).
Haferkamp, H., et al., "Laser-Aided Material Identification for the Waste Sorting Process", Proceedings, SPIE 2092, Substance Detection Systems, Mar. 28, 1994, p. 328, doi:10.1117/12.171252. (Abstract only).
Hopewell, J., et al., "Plastics Recycling: Challenges and Opportunities", Philosophical Transactions of the Royal Society of London B: Biological Sciences, Jun. 14, 2009, vol. 364(1526), pp. 2115-2126, doi:10.1098/rstb.2008.0311.
Mi, C., et al., "Efficient Upconversion Luminescence from Ba5Gd8Zn4O21:Yb(3+), Er(3+) Based on a Demonstrated Cross-Relaxation Process", Sci. Rep.—UK, Mar. 2, 2016, vol. 6, p. 22545, doi:10.1038/srep22545.
Park, C.-H., et al., "PVC Removal from Mixed Plastics by Triboelectrostatic Separation", J. Hazard. Mater., Jun. 1, 2007, vol. 144(1-2), pp. 470-476, https://doi.org/10.1016/j.jhazmat.2006.10.060. (Abstract only).
Pokhrel, M., et al., "High Upconversion Quantum Yield at Low Pump Threshold in Er3+/Yb3+ Doped La2O2S Phosphor", Mater. Lett., May 15, 2013, vol. 99, pp. 86-89, https://doi.org/10.1016/j.matlet.2013.02.062. (Abstract only).
Pokhrel, M., et al., "Highly Efficient NIR to NIR and VIS Upconversion in Er3+ and Yb3+ Doped in M2O2S (M=Gd, La, Y)", J. Mater. Chem. A, 2013, vol. 1(38), pp. 11595-11606, doi:10.1039/C3TA12205K. (Abstract only).
Scott, D.M., "A Two-Colour Near-Infrared Sensor for Sorting Recycled Plastic Waste", Meas. Sci. and Technol., 1995, vol. 6, p. 156, https://doi.org/10.1088/0957-0233/6/2/004. (Abstract only).
Etchart, I., et al., "Efficient Oxide Phosphors for Light Upconversion; Green Emission from Yb3+ and Ho3+ Co-Doped Ln2BaZnO5 (Ln=Y, Gd)", J Mater. Chem., 2011, vol. 21, pp. 1387-1394, doi:10.1039/c0jm01652g.
Extended European Search Report dated Feb. 13, 2018, received from the European Patent Office, for European Application No. 17001253.8, pp. 1-5.

\* cited by examiner

COMPOSITION WITH ENHANCED LUMINESCENCE

CROSS-REFERENCE

This application claims priority from European application no. 17001253.8, filed Jul. 21, 2017, which is incorporated by reference in its entirety.

FIELD OF THE INVENTION

The present invention relates to a composition for photoluminescence of the chemical formula $M_{2(1-y-z)}Yb_{2y}Rem_{2z}ADO_{5-x}Hal_{2x}$, a method for producing said composition, and uses of said composition.

BACKGROUND

Photoluminescence is the emission of photons from direct photoexcitation of any form of matter after the absorption of photons (electromagnetic radiation). The photoluminescence can include down-shifting or up-conversion processes. If the energy of the emitted photons is less than the energy of the absorbed photons, the photoluminescence is described as down-shifting process. Vice versa, photon up-conversion is an optical process in which photons with low energy are transformed inside some optical medium into photons with higher energy. The down-shifting and up-conversion process in solid host matrixes doped with ions of rare earth elements ("Rem") are based on emission of visible, near infrared (NIR) or infrared (IR) photons under excitation with visible, NIR or IR light.

Photoluminescent materials generally have unique properties and are thus particularly useful for plastic sorting and anti-counterfeiting. Tracer-based sorting (TBS) and tracer-based identification (TBI) are technologies in which materials are marked with photoluminescent, inert tracers—the photonic marker—and are then identified either in a high throughput conveyer-belt process or a simple screening device via the distinctive properties of their luminescence. To be applicable as photonic markers, materials should demonstrate several features, particularly a high photoluminescence quantum yield (PLQY); stability in air, water and at higher temperatures; efficient production characteristics: synthesis temperature$\leq$1.300° C., not too many process steps; good biocompatibility; small particle sizes as of production; and good reproducibility of the PLQY, decay time, and emission lines.

Several different technologies are currently proposed that have relevance to both plastics recycling and anti-counterfeiting industries. The main option is to use a Fourier-transform infrared (FT-IR) spectroscopic technique for identification of the polymer type, as well as employing color recognition cameras to enable sorting of clear versus colored fractions (cf. for example J. Hopewell, R. Dvorak, E. Kosior, Philosophical Transactions of the Royal Society of London B: Biological Sciences 2009, 364, 2115). However, such approaches are not able, for instance, to differentiate between polyvinyl chloride (PVC) and polyethylene terephthalate (PET), which is extremely important since combinations of these two resins can result in the release of hydrochloric gases. Furthermore, a PET resin will be ruined if it contains even a few parts per million (ppm) of PVC resin (cf. D. M. Scott, Meas. Sci. and Technol. 1995, 6, 156). To solve this problem, sorting technologies based on X-ray transmission have been used for correct separation of PVC from other plastic waste streams, with its high (59 wt. %) chlorine concentration giving rise to a unique absorption peak in the X-ray spectrum (cf. I. Arvanitoyannis, L. Bosnea, Food Rev. Int. 2001, 17, 291; M. M. Fisher, Plastics and the Environment, John Wiley & Sons, Inc., 2005). Raman spectroscopy has also been experimented for similar applications (cf. C.-H. Park, H.-S. Jeon, J.-K. Park, J. Hazard. Mater. 2007, 144, 470; J. Florestan, A. Lachambre, N. Mermilliod, J. C. Boulou, C. Marfisi, Resources, Conservation and Recycling 1994, 10, 67), while carbon dioxide laser-based systems have been developed for determining the unique thermal response of each polymer (cf. H. Haferkamp, I. Burmester, K. Engel, Vol. 2092, 1994, pp. 328).

As another technology for plastic recycling/sorting and anti-counterfeiting, there have been used systems which are based on the addition of a marker that, once standardized, would provide a unique identification of a specific resin type. Inorganic crystalline materials doped with Rem ions are examples of prospective photonic markers for plastic sorting and anti-counterfeiting. A particular example of these materials, which has been known for years, is yttrium and gadolinium oxysulfide doped with Rem (J.-C. Boyer and F. C. J. M. van Veggel, Nanoscale, 2010, 2, 1417-1419). Yttrium and gadolinium oxysulfide doped with REM ions exhibits luminescence in the visible, NIR and IR spectral range after excitation with IR light. However, for many applications, sulphur in the composition is a significant drawback. For example, gadolinium oxysulfide is unstable at high temperature and can slowly hydrolyze with formation of hydrogen sulfide in moist air and aqueous solutions. Other host materials with very efficient up-conversion emission are halogen host compounds (cf. M. Pokhrel, A. K. Gangadharan and D. K. Sardar, Mater. Lett., 2013, 99, 86-89; M. Pokhrel, G. A. Kumar and D. K. Sardar, J. Mater. Chem. A, 2013, 1, 11595-11606). However, these materials suffer from low chemical stability, particularly if the halogen is Cl, Br, or I. Rare earth oxides like $Y_2O_3$, $Gd_2O_3$, $La_2O_3$ etc. can be considered as an alternative. However, this type of materials suffers from high temperature needed for the solid state synthesis, shows a relatively low PLQY and has a low chemical stability (especially $La_2O_3$). Recently, it has been demonstrated that ternary oxides compositions such as $Ln_2BaZnO_5:Yb^{3+},Er^{3+}$, $Y_2BaZnO_5:Yb^{3+},Er^{3+}$ and $Gd_2BaZnO_5:Yb^{3+},Er^{3+}$ can provide a reasonably high up-conversion photoluminescence quantum yield (UC PLQY) together with rather moderate chemical stability as synthetized by a solid state reaction at 1200° C. (sintering during several days) (cf. I. Etchart, A. Huignard, M. Berard, M. N. Nordin, I. Hernandez, R. J. Curry, W. P. Gillin and A. K. Cheetham, J. Mater. Chem., 2010, 20, 3989-3994; I. Etchart, M. Berard, M. Laroche, A. Huignard, I. Hernandez, W. P. Gillin, R. J. Curry and A. K. Cheetham, Chem. Commun., 2011, 47, 6263-6265). $Ba_5Gd_8Zn_4O_{21}:Yb^{3+},Er^{3+}$ is a further example of another stoichiometry for an UC material published in the literature (cf. C. Mi, J. Wu, Y. Yang, B. Han and J. Wei, Sci. Rep.-UK, 2016, 6, 22545)].

As already outlined above, high PLQY and long-term chemical stability are two of the key requirements for photonic markers. With high PLQY, the level of doping concentration can be reduced significantly, resulting in reduction of production costs and reduction of the (negative) effects of the marker on the properties of marked materials. Long chemical stability should provide an opportunity to operate on a ten-years timescale. Up to now, the highest up-conversion PLQY was reported as ~2% of bulk $\beta$-$NaYF_4$:$18Yb^{3+}$,$2Er^{3+}$ and $Y_2O_2S$:$8Yb^{3+}$,$6Er^{3+}$ under a high excitation power density of ~100 W/cm². However, these materials either contain sulfur (oxysulfide) or are slowly hydrolyzed (in case of fluoride), i.e. no long-term chemical stability is provided. The chemically stable ternary oxides show a PLQY of 2.4%, which is, however, not sufficient to provide good cost/efficiency ratio which is required for the application in the field of photonic markers.

SUMMARY OF THE INVENTION

In view of the above, the technical problem underlying the present invention is to provide a new composition for photoluminescence, which should achieve a high photoluminescence quantum yield (PLQY) and, at the same time, should have stability in air, water and at higher temperatures, should have efficient production characteristics (synthesis temperature≤1.300° C., not too many process steps), should exhibit good biocompatibility, should have a small particle size as of production, and should have good reproducibility of the PLQY, decay time and emission lines.

The solution to the above technical problem is achieved by the embodiments characterized in the claims.

DETAILED DESCRIPTION

Figure 1:
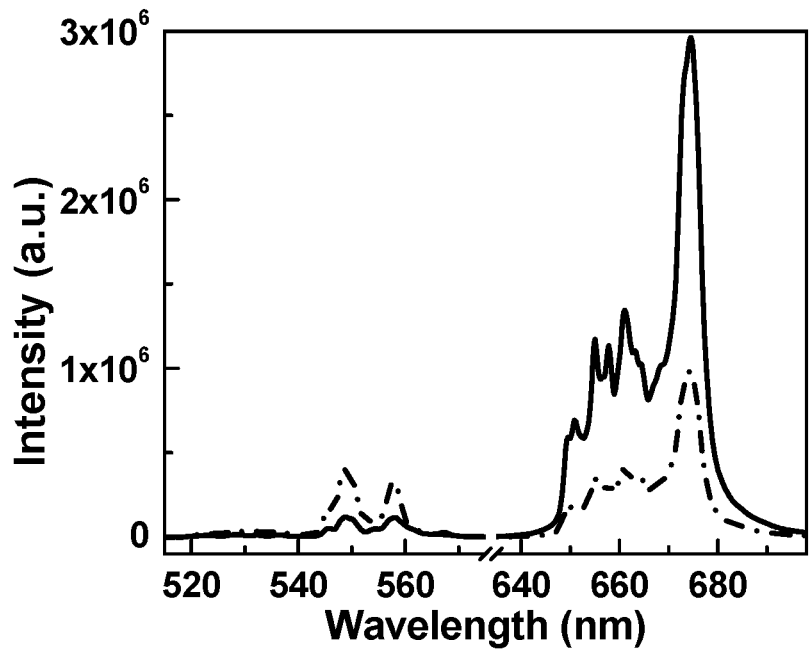
FIG. 1 shows UC emission spectra of the compositions of Example 1 (dashed line: $Y_{1.69}Yb_{0.24}Er_{0.07}BaZnO_5$, solid line: $Y_{1.69}Yb_{0.24}Er_{0.07}BaZnO_{4.9}F_{0.2}$).

In particular, the present invention provides a composition for photoluminescence of the chemical formula $M_{2(1-y-z)}Yb_{2y}Rem_{2z}ADO_{5-x}Hal_{2x}$, wherein M is at least one element selected from Y, Gd, La, Lu, In, Sc, Bi and mixtures thereof;

A is at least one element selected from Ba, Sr, Ca and mixtures thereof;

D is at least one element selected from Zn, Mg, Cu, Ni, Mn, Fe and mixtures thereof;

Hal is at least one element selected from F, Cl, Br, I and mixtures thereof;

Rem is at least one rare earth element selected from Ce, Dy, Er, Eu, Ho, Nd, Pr, Sm, Tb, Tm and mixtures thereof;

x is from 0.02 to 2.5;

y is from 0 to 1;

z is from 0 to 1;

at least one of y and z is at least 0.001, the total sum of y+z is at most 1.

The composition of the present invention has a host matrix of the chemical formula $M_2ADO_{5-x}Hal_{2x}$ which is doped with $Yb^{3+}$ and/or the specific Rem (rare earth metal) ions defined below.

In the above chemical formula $M_{2(1-y-z)}Yb_{2y}Rem_{2z}ADO_{5-x}Hal_{2x}$, M is at least one element selected from Y (yttrium), Gd (gadolinium), La (lanthanum), Lu (lutetium), In (indium), Sc (scandium), and Bi (bismuth). M is one of the host-forming elements of the composition of the present invention. The element M in the above chemical formula may either be a mixture of one or more of the aforementioned elements M, or the element M may only be one single element.

According to a specific embodiment of the present invention, the element M is completely substituted by $Yb^{3+}$ ions and/or Rem ions (i.e. y+z=1). In this embodiment, the $Yb^{3+}$ ions and/or REM ions play a dual role as the host-forming elements and the photoactive elements of the composition of the present invention.

According to a preferred embodiment of the present invention, M is at least one element selected from Y, Gd and La. According to a particularly preferred embodiment, M is Y.

In the above chemical formula $M_{2(1-y-z)}Yb_{2y}Rem_{2z}ADO_{5-x}Hal_{2x}$, A is at least one element selected from Ba (barium), Sr (strontium) and Ca (calcium). A is one of the host-forming elements of the composition of the present invention The element A in the above chemical formula may either be a mixture of one or more of the aforementioned elements A, or the element M may only be one single element. According to a preferred embodiment of the present invention, A is Ba.

In the above chemical formula $M_{2(1-y-z)}Yb_{2y}Rem_{2z}ADO_{5-x}Hal_{2x}$, D is at least one element selected from Zn (zinc), Mg (magnesium), Cu (copper), Ni (nickel), Mn (manganese) and Fe (iron). D is one of the host-forming elements of the composition of the present invention. The element D in the above chemical formula may either be a mixture of one or more of the aforementioned elements D, or the element D may only be one single element. According to a preferred embodiment of the present invention, D is at least one element selected from Zn and Mg. According to a particularly preferred embodiment, D is Zn.

In the above chemical formula $M_{2(1-y-z)}Yb_{2y}Rem_{2z}ADO_{5-x}Hal_{2x}$, Hal is at least one element selected from F (fluorine), Cl (chlorine), Br (bromine) and I (iodine). Hal is one of the host-forming elements of the composition of the present invention. By substituting part of the oxygen anions in known ternary oxides by the above-defined halogen anions, it is advantageously possible to increase the photoluminescence quantum yield (PLQY) while maintaining the chemical stability of the composition for photoluminescence.

The element Hal in the above chemical formula may either be a mixture of one or more of the aforementioned elements Hal, or the element Hal may only be one single element. According to a preferred embodiment, Hal is F.

Besides the Hal anions (F⁻, Cl⁻, Br⁻ and or I⁻), the composition of the present invention further contains oxygen anions ($O^{2-}$ ions) as a host-forming element. In the chemical formula $M_{2(1-y-z)}Yb_{2y}Rem_{2z}ADO_{5-x}Hal_{2x}$, "x" is a parameter defining the ratio of Hal anions and oxygen anions. According to the present invention, x is from 0.02 to 2.5. In case of x being below 0.02, a high photoluminescence quantum yield (PLQY) cannot be achieved. According to a preferred embodiment of the present invention, x is from 0.02 to 1.5, more preferably from 0.03 to 1.0, more preferably from 0.04 to 0.5 and most preferably from 0.05 to 0.25.

The composition of the present invention is doped with $Yb^{3+}$ and/or Rem ions, wherein y is a parameter defining the amount of $Yb^{3+}$ ions which substitute the M ions (e.g. $Y^{3+}$ ions) in the composition and wherein z is a parameter defining the amount of Rem ions which substitute the M ions in the composition of the present invention. $Yb^{3+}$ and Rem ions are the photoactive elements of the composition of the present invention. Moreover, since $Yb^{3+}$ and/or Rem ions substitute the M ions in the composition, $Yb^{3+}$ and Rem ions also (partially, or in case of y+z=1 fully) act as host-forming elements of the composition. By varying the doping degree of $Yb^{3+}$ ions and Rem ions, i.e. by varying the ratio of $Yb^{3+}$ ions to M ions and/or varying the ratio of Rem ions to M ions and/or by varying the ratio of $Yb^{3+}$ ions to Rem ions, it is advantageously possible to tune/adjust the up-conversion/down-shifting emission in green and red and the excite state lifetime of the composition of the present invention such that the composition shows a unique signature under excitation with visible, NIR or IR light, particularly IR light.

In the above chemical formula $M_{2(1-y-z)}Yb_{2y}Rem_{2z}ADO_{5-x}Hal_{2x}$, Rem is at least one rare earth element selected from Ce (cerium), Dy (dysprosium), Er (erbium), Eu (europium), Ho (holmium), Nd (neodymium), Pr (praseodymium), Sm (samarium), Tb (terbium) and Tm (thulium). The element Rem in the above chemical formula may either be a mixture of one or more of the aforementioned elements Rem, or the element Rem may only be one single element. According to a preferred embodiment of the present invention, Rem is at least one rare earth element selected from Er, Ho, Tm and Pr. According to a particularly preferred embodiment, Rem is Er.

According to the present invention, y is from 0 to 1. "y" indicates the amount of M ions which are substituted by $Yb^{3+}$ ions. In case of y being 0, no $Yb^{3+}$ ions are present in the composition of the present invention, whereas in case of y being 1, all of the M ions are substituted by $Yb^{3+}$ ions. In case of y being 0.5, half of the M ions in the composition of the present invention are substituted by $Yb^{3+}$ ions.

The lower limit of y is 0 in the present invention, but in specific embodiments of the present invention the lower limit of y may e.g. be 0.05, 0.10, 0.15, 0.20, 0.25, 0.30, 0.35, 0.40, 0.45, 0.50, 0.55, 0.60, 0.65, 0.70, 0.75, 0.80, 0.85, 0.90 or 0.95. The upper limit of y is 1 in the present invention, but in specific embodiments of the present invention the upper limit of y may e.g. be 0.95, 0.90, 0.85, 0.80, 0.75, 0.70, 0.65, 0.60, 0.55, 0.50, 0.45, 0.40, 0.35, 0.30, 0.25, 0.20, 0.15, 0.10 or 0.05.

According to the present invention, z is from 0 to 1. "z" indicates the amount of M ions which are substituted by the aforementioned specific Rem ions. In case of z being 0, none of the aforementioned specific Rem ions are present in the composition of the present invention, whereas in case z being 1, all of the M ions are substituted by the aforementioned specific Rem ions. In case of z being 0.50, half of the M ions in the composition of the present invention are substituted by the aforementioned specific Rem ions.

The lower limit of z is 0 in the present invention, but in specific embodiments of the present invention the lower limit of y may e.g. be 0.05, 0.10, 0.15, 0.20, 0.25, 0.30, 0.35, 0.40, 0.45, 0.50, 0.55, 0.60, 0.65, 0.70, 0.75, 0.80, 0.85, 0.90 or 0.95. The upper limit of z is 1 in the present invention, but in specific embodiments of the present invention the upper limit of z may e.g. be 0.95, 0.90, 0.85, 0.80, 0.75, 0.70, 0.65, 0.60, 0.55, 0.50, 0.45, 0.40, 0.35, 0.30, 0.25, 0.20, 0.15, 0.10 or 0.05.

According to the present invention, at least one of y and z is at least 0.001, i.e. at least 0.1% of the M ions are substituted by $Yb^{3+}$ or Rem ions. In case at least one of y and z is not at least 0.001, a sufficient PLQY cannot be achieved. According to specific embodiments of the present invention, at least one of y and z is at least 0.005, at least 0.01, at least 0.03, at least 0.04, at least 0.10 or at least 0.12.

According to the present invention, the total sum of y+z is at most 1. In case of y+z=1, the element M in the composition of the present invention is completely substituted by $Yb^{3+}$ ions and/or Rem ions. According to specific embodiments of the present invention, the total sum of y+z is at most 0.95, at most 0.90, at most 0.85, at most 0.80, at most 0.75, at most 0.70, at most 0.65, at most 0.60, at most 0.55, at most 0.50, at most 0.45, at most 0.40, at most 0.35, at most 0.30, at most 0.25, at most 0.20, at most 0.15 or at most 0.10.

According to a preferred embodiment of the present invention,

M is at least one element selected from Y, Gd and La (most preferably, M is Y);
A is at least one element selected from Ba and Sr (most preferably, A is Ba);
D is at least one element selected from Zn and Mg (most preferably, D is Zn);
Hal is at least one element selected from F, Cl, Br and I (most preferably, Hal is F);
Rem is at least one rare earth element selected from Er, Ho, Tm and Pr (most preferably, Rem is Er);
x is from 0.02 to 2.5;
y is from 0 to 0.5;
z is from 0 to 0.5; and
at least one of y and z is at least 0.01.

According to a particularly preferred embodiment, y is from 0.001 to 0.50, more preferably from 0.04 to 0.36 and most preferably from 0.12 to 0.24.

Moreover, z is preferably from 0.001 to 0.50, more preferably from 0.01 to 0.20 and most preferably from 0.03 to 0.15.

According to a specific embodiment of the present invention, the composition is only doped with $Yb^{3+}$, i.e. z=0. In this case, y is preferably from 0.005 to 0.4, more preferably from 0.01 to 0.36, most preferably from 0.02 to 0.28. The above ranges of y advantageously result in an excellent PLQY for this system.

The composition for photoluminescence performs down-shifting and/or up-conversion processes. In the specific embodiment, where the composition is only doped with $Yb^{3+}$, i.e. z=0, the composition for photoluminescence performs only down-shifting processes.

The method for producing the composition for photoluminescence of the present invention is not particularly limited, and e.g. a solid state reaction, a sol-gel process, hydrothermal synthesis or coprecipitation may be used for production.

According to a specific embodiment of the present invention, the method for producing the composition for photoluminescence of the present invention is a solid state reaction method. The solid state reaction method for producing the composition for photoluminescence of the present invention comprises the steps of:

providing a raw material mixture of an M-source, an A-source, a D-source, a Hal-source and at least one of a Yb-source and an Rem-source, wherein M is at least one element selected from Y, Gd, La, Lu, In, Sc and Bi; A is at least one element selected from Ba, Sr and Ca; D is at least one element selected from Zn, Mg, Cu, Ni, Mn and Fe; Hal is at least one element selected from F, Cl, Br and I; and Rem is a rare earth element selected from Ce, Dy, Er, Eu, Ho, Nd, Pr, Sm, Tb and Tm;

grinding the raw material mixture to obtain a raw material powder mixture;

pre-annealing the raw material powder mixture at a temperature of from 1000° C. to 1300° C. to obtain a pre-annealed powder mixture; grinding the pre-annealed powder mixture to obtain a ground pre-annealed powder mixture; and annealing the ground pre-annealed powder mixture at a temperature range of from 1000° C. to 1300° C. to obtain the composition for photoluminescence.

The above method of the present invention can be used to produce the composition for photoluminescence of the present invention. Accordingly, the explanations provided above with respect to the composition of the present invention also apply for the method of the present invention.

In the first step of the above method, there is provided a raw material mixture of an M-source, an A-source, a D-source, a Hal-source and at least one of a Yb-source and an Rem-source, wherein A, D, Hal and Rem are the same as defined above with respect to the composition of the present invention. The M-source, the A-source, the D-source, the Hal-source and at least one of the Yb-source and the Rem-source are mixed in the stoichiometric ratio which is desired for the to be obtained composition of the present invention.

The M-source of the present invention is not particularly limited, and any source which can provide the element M for the composition of the present invention can be used, e.g. compounds having the chemical formulas $M_2O_3$, $M(OH)_3 \cdot xH_2O$, $M(NO_3)_3 \cdot xH_2O$, $M_2(C_2O_4)_3 \cdot xH_2O$, $M_2(SO_4)_3 \cdot xH_2O$, $M(C_{11}H_{19}O_2)_3$ and $M_2(CO_3)_3 \cdot xH_2O$, wherein x specifies the amount of crystallization water. The M-source can be one specific compound or a mixture of two or more compounds. According to a preferred embodiment of the present invention, the M-source is an oxide of the element M, for example $Y_2O_3$, $Gd_2O_3$, $La_2O_3$, etc.

The A-source of the present invention is not particularly limited, and any source which can provide the element A for the composition of the present invention can be used, e.g. compounds having the chemical formulas $ACO_3 \cdot xH_2O$, $A(OH)_2 \cdot xH_2O$, $A(NO_3)_2 \cdot xH_2O$, $ASO_4 \cdot xH_2O$, $A_3(PO_4)_2 \cdot xH_2O$, AS, $A(OOCH_3)_2 \cdot xH_2O$ and $[A(C_{11}H_{19}O_2)_2]_4 \cdot xH_2O$, wherein x specifies the amount of crystallization water. The A-source can be one specific compound or a mixture of two or more compounds. According to a preferred embodiment of the present invention, the A-source is a carbonate of the element A, for example $BaCO_3$, $SrCO_3$, $CaCO_3$, etc.

The D-source of the present invention is not particularly limited, and any source which can provide the element D for the composition of the present invention can be used, e.g. compounds having the chemical formulas DO, $DCO_3 \cdot xH_2O$, $D(OH)_2 \cdot xH_2O$, $D(NO_3)_2 \cdot xH_2O$, $DSO_4 \cdot xH_2O$, $D_3(PO4)_2 \cdot xH_2O$, DS, $D(C_2H_3O_2)_2 \cdot xH_2O$ and $D(C_5H_7O_2)_2 \cdot xH_2O$, wherein x specifies the amount of crystallization water. The D-source can be one specific compound or a mixture of two or more compounds. According to a preferred embodiment of the present invention, the D-source is an oxide of the element D, for example ZnO, MgO, CuO, etc.

The Hal-source of the present invention is not particularly limited, and any source which can provide the element Hal for the composition of the present invention can be used, e.g. halides of the element M, A and/or D. The Hal-source can be one specific compound or a mixture of two or more compounds. According to a preferred embodiment of the present invention, the Hal-source is a halide of the element M, for example $YF_3$, $YCl_3$, $Gd F_3$, etc.

The at least one of the Yb-source and the Rem-source of the present invention are not particularly limited, and any source which can provide the element Yb or Rem for the composition of the present invention can be used, e.g. compounds having the chemical formulas $Yb_2O_3$, $Yb(OH)_3 \cdot xH_2O$, $Yb(NO_3)_3 \cdot xH_2O$, $Yb_2(C_2O_4)_3 \cdot xH_2O$, $Yb_2(SO_4)_3 \cdot xH_2O$, $Yb(C_{11}H_{19}O_2)_3$ and $Yb_2(CO_3)_3 \cdot xH_2O$, wherein x specifies the amount of crystallization water, or $Rem_2O_3$, $Rem(OH)_3 \cdot xH_2O$, $Rem(NO_3)_3 \cdot xH_2O$, $Rem_2(C_2O_4)_3 \cdot xH_2O$, $Rem_2(SO_4)_3 \cdot xH_2O$, $Rem(C_{11}H_{19}O_2)_3$ and $Rem_2(CO_3)_3 \cdot xH_2O$, wherein x specifies the amount of crystallization water. The Yb-source can be one specific compound or a mixture of two or more compounds. The Rem-source can also be one specific compound or a mixture of two or more compounds. According to a preferred embodiment of the present invention, the Yb-source is an oxide of Yb, for example $Yb_2O_3$, and the Rem-source is an oxide of the element Rem, for example $Er_2O_3$, $Ho_2O_3$, $Tm_2O_3$, etc.

In the next step of the method of the present invention, the raw material mixture is ground to obtain a (homogeneous) raw material powder mixture. Grinding can be performed manually or with a grinding machine. Grinding provides intermixing of the components and advantageously increases diffusion in the high temperature solid state reaction. The raw material mixture is preferably ground until the average particle size is 100 μm or less.

In the next step of the method of the present invention, the raw material powder mixture is pre-annealed at a temperature of from 1000° C. to 1300° C. to obtain a pre-annealed powder mixture. The pre-annealing temperature is preferably from 1100° C. to 1300° C., since at lower temperatures the diffusion rate may be slow. The pre-annealing time is not particularly limited, but the preferred pre-annealing time is from 1 to 8 hours, more preferably from 2 to 7 hours, and most preferably from 3 to 5 hours. In case of shorter pre-annealing times, intermixing of the components may not be sufficiently achieved. The annealing is preferably carried out in an air atmosphere.

In the next step of the method of the present invention, the pre-annealed powder mixture is again ground to obtain a ground pre-annealed powder mixture. Grinding provides intermixing of the components and advantageously increases diffusion in the high temperature solid state reaction.

In the next step of the method of the present invention, the ground pre-annealed powder mixture is annealed at a temperature of from 1000° C. to 1300° C. to obtain the composition for photoluminescence of the present invention. The annealing temperature is preferably from 1100° C. to 1300° C., more preferably from 1200° C. to 1300° C. At too low temperatures, the diffusion rate is slow and thus $M_{2(1-y-z)}Yb_{2y}Rem_{2z}ADO_{5-x}Hal_{2x}$ cannot be formed. On the other hand, too high temperatures lead to the formation of powders with particle sizes larger than 100 μm. The annealing time is not particularly limited, but the preferred annealing time is from 1 to 40 hours, more preferably from 1 to 16 hours. The annealing is preferably carried out in an air atmosphere.

Optionally, the obtained composition for photoluminescence of the present invention is afterwards ground again. Grinding can be performed manually or with a grinding machine. The preferred particle size which is obtained by this grinding step is preferably 45 µm or smaller.

In a further aspect, the present invention provides the use of the composition for photoluminescence of the present invention for (plastic) sorting or as photonic marker in anti-counterfeiting or for quality control.

In particular, the composition for photoluminescence of the present invention can be used for sorting objects or materials like plastics. The composition of the present invention may be incorporated into any material or object, and said marked material or object may then be (automatically) separated from a mixture of various materials or objects (in a suitable device/machine) after the material which contains the composition of the present invention has been identified by a spectrophotometric analysis. The term "incorporated" is to be understood in a broad sense and covers not only the incorporation of the composition into the bulk of a material or object but also the incorporation into a carrier that is attached to a material or object. Suitable carriers can be adhesive labels, tags, stickers or the like.

According to another embodiment, the composition for photoluminescence of the present invention can used be as an anti-counterfeiting (photonic) marker. In particular, the composition of the present invention may be incorporated into an object or material as a marker, which object or material may then be identified by a spectrophotometric analysis so as to determine the presence or absence of the marker, thereby determining whether the object or material is authentic or not.

According to another embodiment, the composition for photoluminescence of the present invention may be incorporated into an object or material as a marker for quality control or formulation control. For example, this allows to control the presence and/or amount of a marked component in a mixture of components or in a manufactured material or object.

The composition for photoluminescence performs down-shifting and/or up-conversion processes. Both down-shifting and/or up-conversion can be exploited for applications like sorting, anti-counterfeiting and quality control. Both physical processes have technical advantages. For example down-shifting needs less energy and therefore is more efficient, while up-conversion enables the emission of visible luminescence upon excitation with invisible IR.

Due to the partial substitution of the oxygen anions of known ternary oxides by halogen anions, the composition of the present invention advantageously achieves an increased intensity of luminescence emission, while the composition of the present invention still has an excellent stability in air, water and also at elevated temperatures. Due to the specific constituents (host matrix and photoactive elements) of the composition of the present invention, the composition can be efficiently produced e.g. by a solid state process having relatively low synthesis/reaction temperatures (annealing temperature≤1300° C.) with only a few process steps. Moreover, due to the rather low reaction temperature, the obtained composition of the present invention preferably has small particle sizes of less than 45 µm, sometimes even less than 10 µm, as of production, and shows an excellent reproducibility of the photoluminescence quantum yield (PLQY), the decay time and the emission lines. Furthermore, it is advantageously possible to tune/adjust the up-conversion emission in green and red and the excite state lifetime of the composition of the present invention by varying the amount of dopants $Yb^{3+}$ and Rem ions (ratio and doping degree) such that the composition shows a unique signature under excitation with visible, NIR and/or IR light. Therefore, the composition for photoluminescence of the present invention can advantageously be used for (plastic) sorting and as an anti-counterfeiting marker, particularly due to the excellent up-conversion and/or down-shifting performance and cost/efficiency ratio.

The present invention will be further illustrated in the following examples without being limited thereto.

EXAMPLES

General Procedure for the Preparation of the Composition of the Present Invention:

All samples were prepared by a high temperature solid state reaction. Stoichiometric amounts of raw materials, i.e. the M-source (e.g. $Y_2O_3$), the A-source (e.g. $BaCO_3$), the D-source (e.g. ZnO), the Hal-source (e.g. $YF_3$) and at least one of the Yb-source (e.g. $Yb_2O_3$) and the Rem source (e.g. $Er_2O_3$) to achieve the desired ratios in the to be obtained composition are mixed and homogeneously ground in an agate mortar. Then, the raw mixture is pre-annealed at 1050° C. for 4 hours in air. The pre-annealed powders were well ground in an agate mortar. Afterwards, the ground pre-annealed powder mixture was annealed at 1100-1300° C. for 1 to 30 hours in air. The final power were reground for optical measurements.

Example 1

Compositions having the chemical formula $M_{2(1-y-z)}Yb_{2y}Rem_{2z}ADO_{5-x}Hal_{2x}$ with M=Y, Rem=Er, A=Ba, D=Zn, Hal=F, y=0.12, z=0.035 and x=0 or x=0.1 were prepared according to the above general procedure. Up-conversion emission spectra of the compositions were recorded upon excitation with a 980 nm laser diode with a power density of 1.5 W/cm².

FIG. 1 shows the up-conversion (UC) emission spectra of the compositions from 500 to 700 nm (dashed line: x=0; solid line: x=0.1). The composition of the present invention (x=0.1) shows an increased UC emission intensity observed at 674 nm. FIG. 1 clearly demonstrates that by substituting oxygen partly by fluoride, the UC emission intensity strongly increases when compared to prior art compositions in which x=0.

Example 2

Compositions having the chemical formula $M_{2(1-y-z)}Yb_{2y}Rem_{2z}ADO_{5-x}Hal_{2x}$ with M=Y, Rem=Er, A=Ba, D=Zn, Hal=F, z=0.07, x=0.1 and y is variable were prepared according to the above general procedure. Up-conversion emission spectra of the compositions were recorded upon excitation with a 980 nm laser diode with a power density of 1.5 W/cm².

Figure 2:
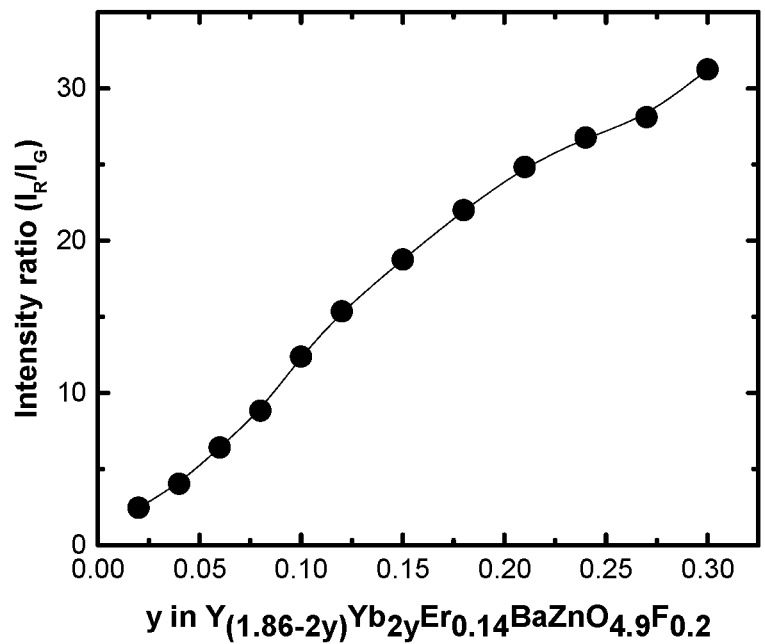
FIG. 2 shows effect of Yb content on the green/red ratio in up-conversion (UC) emission spectra of the compositions with variable y in Example 2.

FIG. 2 shows the effect of Yb content on the green/red ratio in up-conversion (UC) emission spectra of the compositions with variable y. UC red emission intensity observed at 674 nm, UC green emission intensity observed at 548 nm. FIG. 2 clearly demonstrates that the red/green ratio can be tuned by the Yb content.

Example 3

Figure 3:
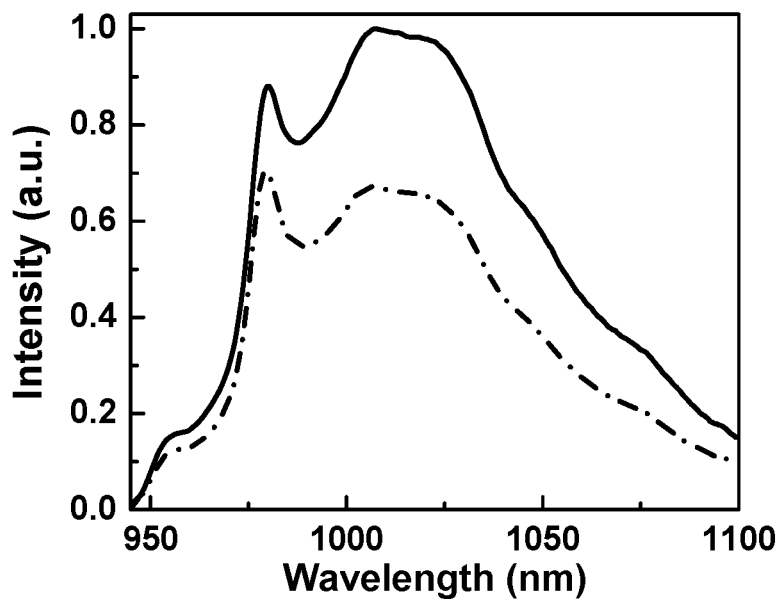
FIG. 3 shows down-shifting emission spectra of the compositions of Example 3 (dashed line: $Y_{1.76}Yb_{0.24}BaZnO_5$, solid line: $Y_{1.76}Yb_{0.24}BaZnO_{4.9}F_{0.2}$).

Compositions having the chemical formula $M_{2(1-y-z)}Yb_{2y}Rem_{2z}ADO_{5-x}Hal_{2x}$ with M=Y, A=Ba, D=Zn, Hal=F, y=0.12, z=0 and x=0 or x=0.1 were prepared according to the above general procedure. Down-shifting emission spectra of the compositions were recorded upon excitation with a 940 nm laser (cf. FIG. 3; dashed line: x=0; solid line x=0.1). FIG. 3 demonstrates the enhancement of down-shifting emission by substituting oxygen partially by fluoride.

Example 4

Compositions having the chemical formula $M_{2(1-y-z)}Yb_{2y}Rem_{2z}ADO_{5-x}Hal_{2x}$ with M=Y, A=Ba, D=Zn, Hal=F, z=0, x=0.14 and y=0.02 and y=0.1 were prepared according to the above general procedure. Down-shifting intensity decays of the compositions were recorded upon excitation at 940 nm and detection at 980 nm (cf. FIG. 4; dashed line: y=0.02; solid line: y=0.1).

Figure 4:
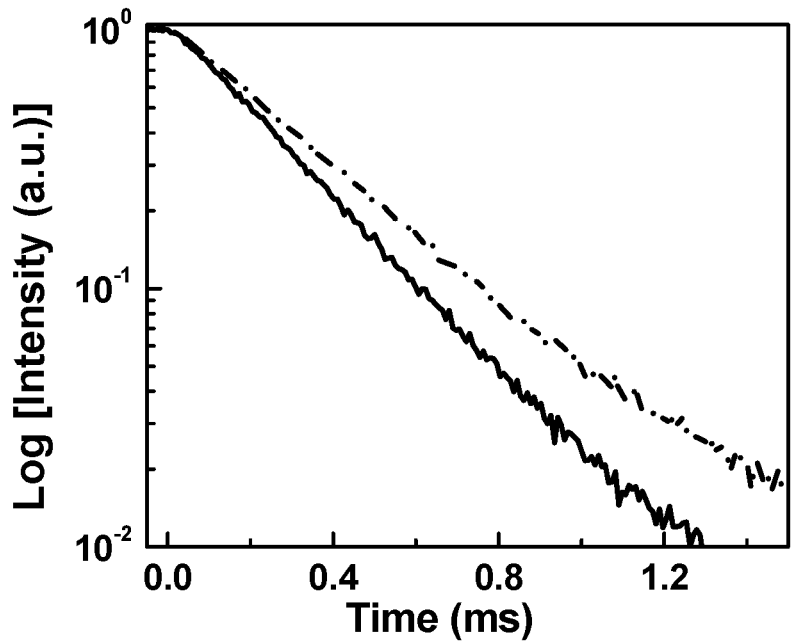
FIG. 4 shows decays of down shifting emission of the compositions of Example 4 (dashed line: $Y_{1.96}Yb_{0.04}BaZnO_{4.86}F_{0.28}$, solid line: $Y_{1.80}Yb_{0.20}BaZnO_{4.86}F_{0.28}$).

FIG. 4 shows that the excited state lifetime of the compositions of the present invention can be efficiently tuned by changing "y", i.e. the doping degree of $Yb^{3+}$.

Example 5

Compositions having the chemical formula $M_{2(1-y-z)}Yb_{2y}Rem_{2z}ADO_{5-x}Hal_{2x}$ with M=Y, Rem=Er, A=Ba, D=Zn, Hal=F, y=0.12, x=0.14 and z=0.002 and z=0.035 were prepared according to the above general procedure. Down-shifting intensity decays of the compositions were recorded upon excitation at 940 nm and detection at 980 nm (cf. FIG. 5; dashed line: z=0.002; solid line: z=0.035).

Figure 5:
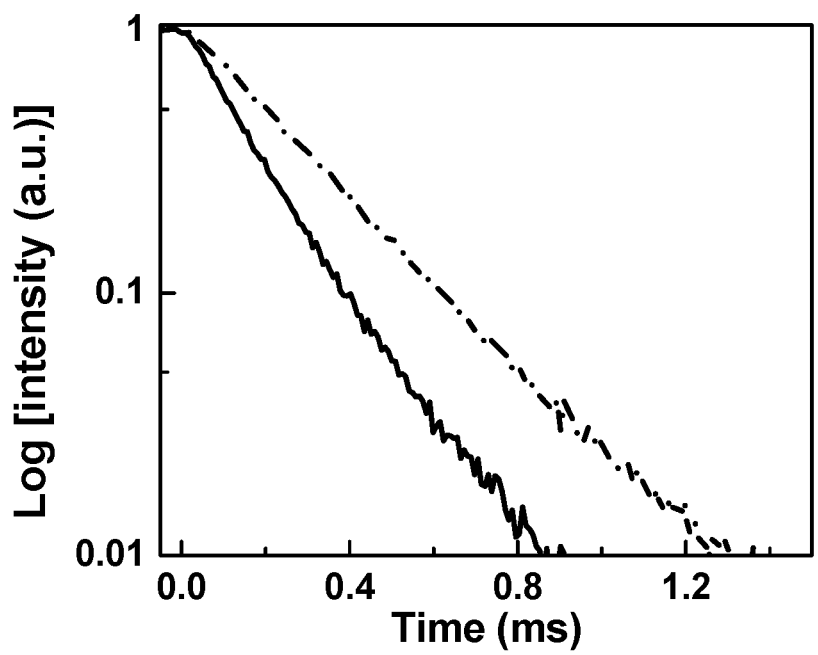
FIG. 5 shows decays of down shifting emission of the compositions of Example 5 (dashed line: $Y_{1.756}Yb_{0.24}Er_{0.004}BaZnO4_{0.86}F_{0.28}$, solid line: $Y_{1.69}Yb_{0.24}Er_{0.07}BaZnO4_{0.86}F_{0.28}$).

FIG. 5 shows that the excited state lifetime of the compositions of the present invention can be efficiently tuned by changing "z", i.e. the doping degree of $Er^{3+}$.

Example 6

Figure 6:
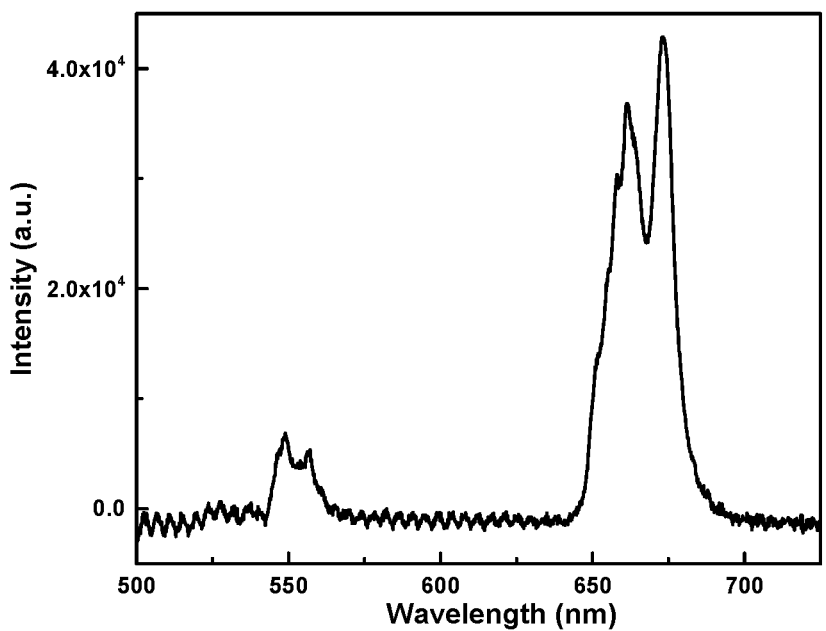
FIG. 6 shows the UC emission spectrum of the composition of Example 6 ($La_{1.68}Yb_{0.24}Er_{0.08}BaZnO_{4.86}F_{0.28}$).

A composition having the chemical formula $M_{2(1-y-z)}Yb_{2y}Rem_{2z}ADO_{5-x}Hal_{2x}$ with M=La, Rem=Er, A=Ba, D=Zn, Hal=F, y=0.12, z=0.04 and x=0.14 was prepared according to the above general procedure by using $La_2O_3$ instead of $Y_2O_3$. Up-conversion intensity of the composition was recorded upon excitation with a 980 nm laser diode with a power density of 2 W/cm² (cf. FIG. 6).

Example 7

Figure 7:
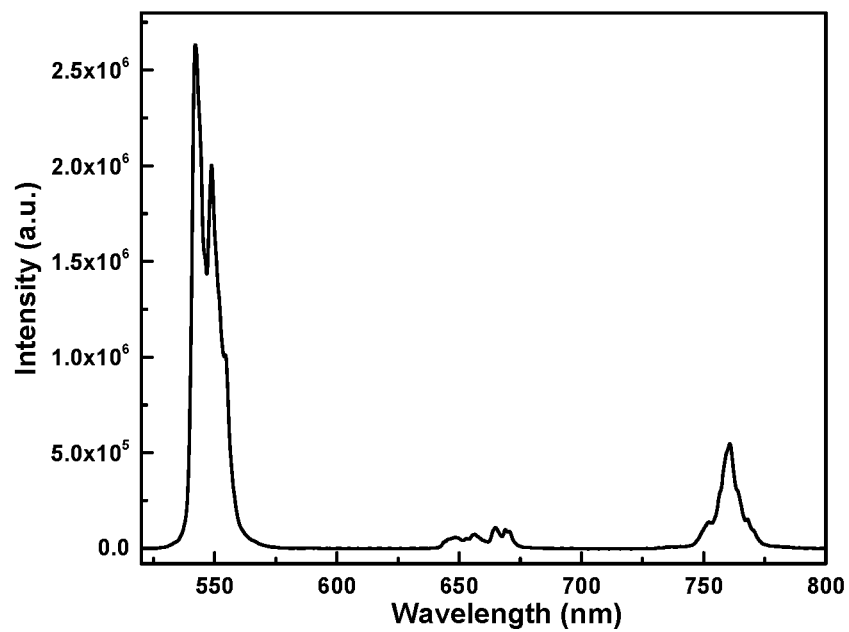
FIG. 7 shows the UC emission spectrum of the composition of Example 7 ($Y_{1.752}Yb_{0.24}Ho_{0.004}BaZnO_{4.86}F_{0.28}$).

A composition having the chemical formula $M_{2(1-y-z)}Yb_{2y}Rem_{2z}ADO_{5-x}Hal_{2x}$ with M=Y, Rem=Ho, A=Ba, D=Zn, Hal=F, y=0.12, z=0.004 and x=0.14 was prepared according to the above general procedure by using $Ho_2O_3$ instead of $Er_2O_3$. Up-conversion intensity of the composition was recorded upon excitation with a 980 nm laser diode with a power density of 1.5 W/cm² (cf. FIG. 7).

Example 8

A composition having the chemical formula $M_{2(1-y-z)}Yb_{2y}Rem_{2z}ADO_{5-x}Hal_{2x}$ with M=Y, Rem=Pr, A=Ba, D=Zn, Hal=F, y=0.12, z=0.004 and x=0.14 was prepared according to the above general procedure by using $Pr_2O_3$ instead of $Er_2O_3$. Up-conversion intensity of the composition was recorded upon excitation with a 980 nm laser diode with a power density of 1.5 W/cm².

Example 9

Figure 8:
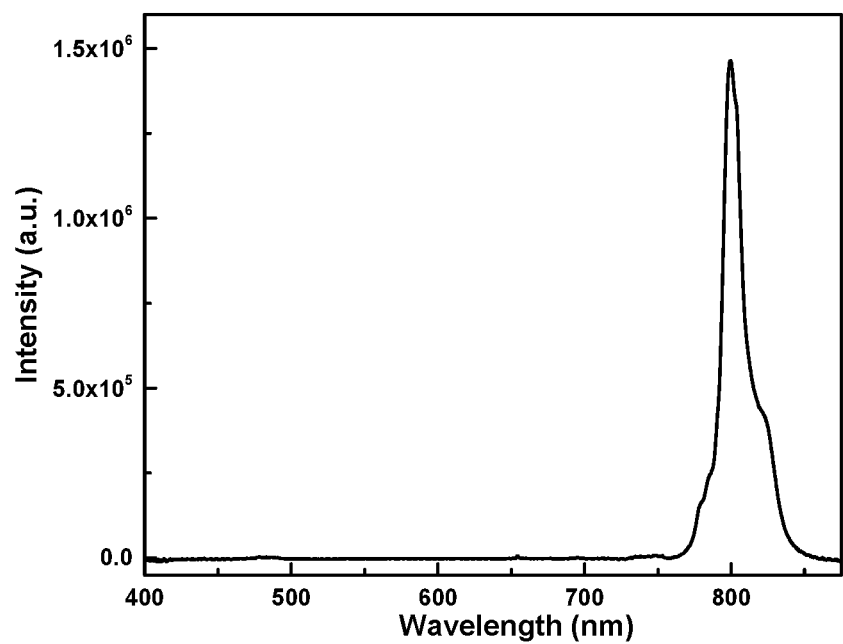
FIG. 8 shows the UC emission spectrum of the composition of Example 9 ($Y_{1.744}Yb_{0.24}Tm_{0.016}BaZnO_{4.86}F_{0.28}$).

A composition having the chemical formula $M_{2(1-y-z)}Yb_{2y}Rem_{2z}ADO_{5-x}Hal_{2x}$ with M=Y, Rem=Tm, A=Ba, D=Zn, Hal=F, y=0.12, z=0.008 and x=0.14 was prepared according to the above general procedure by using $Tm_2O_3$ instead of $Er_2O_3$. Up-conversion intensity of the composition was recorded upon excitation with a 980 nm laser diode with a power density of 1.5 W/cm² (cf. FIG. 8).

Example 10

Figure 9:
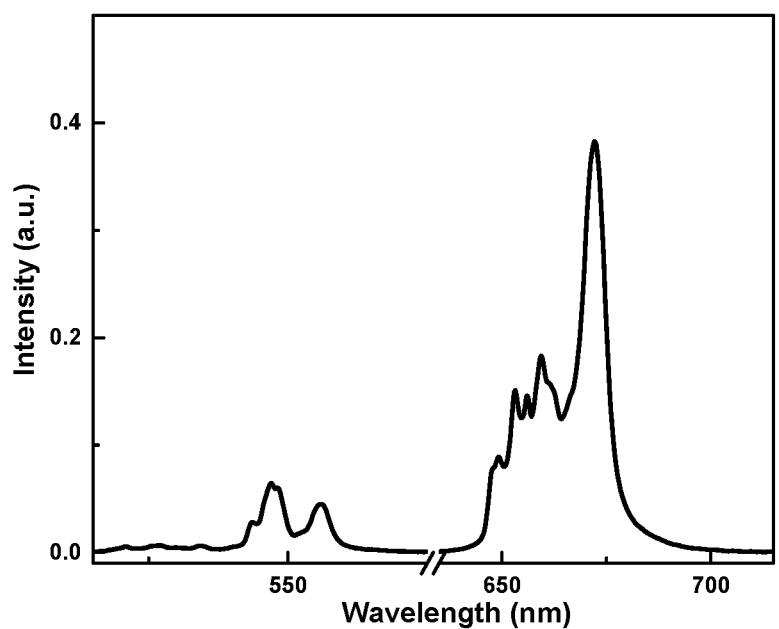
FIG. 9 shows the UC emission spectrum of the composition of Example 10 ($Y_{1.68}Yb_{0.24}Er_{0.08}BaZn_{0.84}Mg_{0.16}O_{4.84}F_{0.32}$).

A composition having the chemical formula $M_{2(1-y-z)}Yb_{2y}Rem_{2z}ADO_{5-x}Hal_{2x}$ with M=Y, Rem=Er, A=Ba, ($D=Zn_{1-k}Mg_k$ wherein k=0.16), Hal=F, y=0.12, z=0.04 and x=0.16 was prepared according to the above general procedure by using ZnO and MgO. Up-conversion intensity of the composition was recorded upon excitation with a 980 nm laser diode with a power density of 2 W/cm² (cf. FIG. 9).

Example 11

Figure 10:
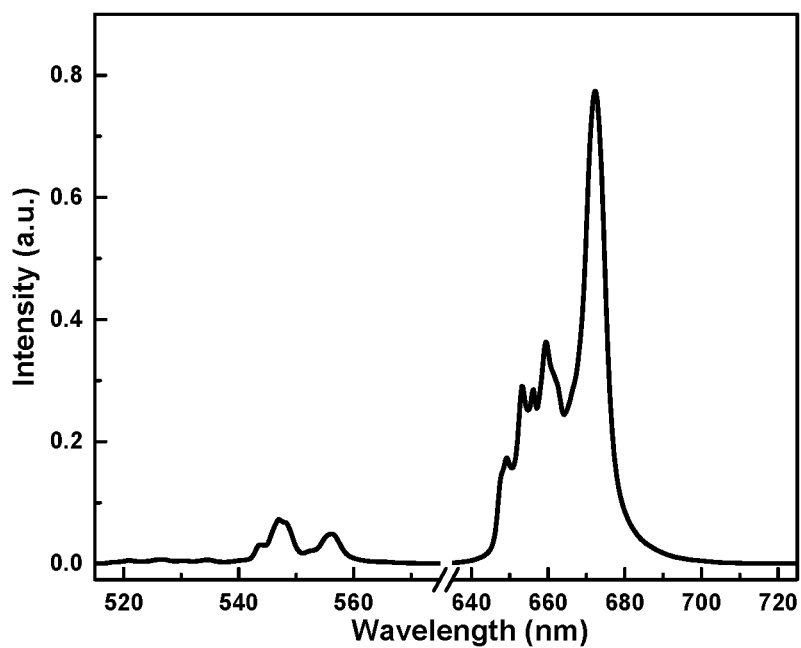
FIG. 10 shows the UC emission spectrum of the composition of Example 11 ($Y_{1.68}Yb_{0.24}Er_{0.08}Ba_{0.8}Sr_{0.2}ZnO_{4.86}F_{0.28}$).

A composition having the chemical formula $M_{2(1-y-z)}Yb_{2y}Rem_{2z}ADO_{5-x}Hal_{2x}$ with M=Y, Rem=Er, ($A=Ba_{1-m}Sr_m$, wherein m=0.2), D=Zn, Hal=F, y=0.12, z=0.04 and x=0.14 was prepared according to the above general procedure by using $BaCO_3$ and $SrCO_3$. Up-conversion intensity of the composition was recorded upon excitation with a 980 nm laser diode with a power density of 2 W/cm² (cf. FIG. 10).

Example 12

Figure 11:
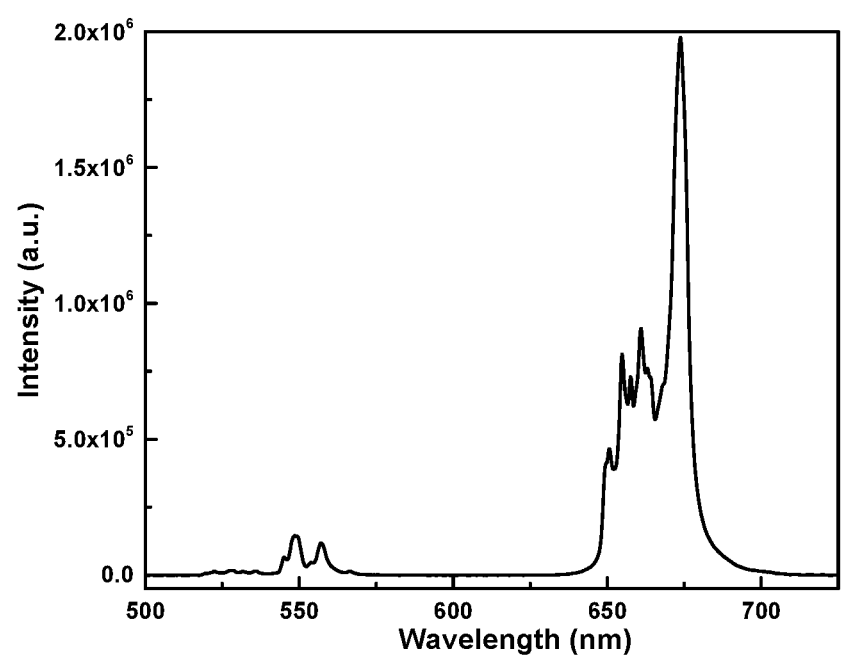
FIG. 11 shows the UC emission spectrum of the composition of Example 12 ($Gd_{1.68}Yb_{0.24}Er_{0.08}BaZnO_{4.86}F_{0.28}$).

A composition having the chemical formula $M_{2(1-y-z)}Yb_{2y}Rem_{2z}ADO_{5-x}Hal_{2x}$ with M=Gd, Rem=Er, A=Ba, D=Zn, Hal=F, y=0.12, z=0.04 and x=0.14 was prepared according to the above general procedure by using $Gd_2O_3$ instead of $Y_2O_3$. Up-conversion intensity of the composition was recorded upon excitation with a 980 nm laser diode with a power density of 2 W/cm² (cf. FIG. 11).

Example 13 (Based on Example 1)

The composition having the chemical formula $M_{2(1-y-z)}Yb_{2y}Rem_{2z}ADO_{5-x}Hal_{2x}$ with M=Y, Rem=Er, A=Ba, D=Zn, Hal=F, y=0.12, z=0.035 and x=0.1 is used to mark plastic parts. For that, the composition is mixed with plastic material, followed by melting and dispersing the mixture in a screw extruder. The mixture is discharged through a strand die, cooled in a water bath and then granulated. The compound produced in this way is processed into finished parts by injection moulding. For sorting out marked parts or fragments of marked parts from a mixture with non-marked materials, the materials are excited with a 980 nm laser diode and examined by an optical detector for UC emission. Emitting materials can be sorted out by equipment for separating plastic parts well-known in the art.

Example 14 (Based on Example 4)

The composition having the chemical formula $M_{2(1-y-z)}Yb_{2y}Rem_{2z}ADO_{5-x}Hal_{2x}$ with M=Y, A=Ba, D=Zn, Hal=F, z=0, x=0.14 and y=0.1 is incorporated into plastic material by plastic extrusion. For authentication of the marked material, the material is excited with a 980 nm laser diode. The excited state lifetime of the down-shifting emission of the incorporated composition is measured by optical detectors well-known in the art. A material showing the lifetime of the incorporated composition is judged as being authentic, while materials with no emission or a different excited state lifetime are judged as non-authentic.

The invention claimed is:

1. A composition for photoluminescence of the chemical formula

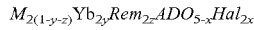

wherein

M is at least one element selected from Y, Gd, La, Lu, In, Sc, Bi, and mixtures thereof;

A is at least one element selected from Ba, Sr, Ca, and mixtures thereof;

D is at least one element selected from Zn, Mg, Cu, Ni, Mn, Fe, and mixtures thereof;

Hal is at least one element selected from F, Cl, Br, I, and mixtures thereof;

Rem is at least one rare earth element selected from Ce, Dy, Er, Eu, Ho, Nd, Pr, Sm, Tb, Tm, and mixtures thereof;

x is from 0.02 to 2.5;

y is from 0 to 1;

z is from 0 to 1;

at least one of y and z is at least 0.001; and the total sum of y+z is at most 1.

2. The composition according to claim 1, wherein

M is at least one element selected from Y, Gd and La;

A is at least one element selected from Ba and Sr;

D is at least one element selected from Zn and Mg;

Hal is at least one element selected from F, Cl, Br and I;

Rem is at least one rare earth element selected from Er, Ho, Tm and Pr;

y is from 0 to 0.5;

z is from 0 to 0.5; and at least one of y and z is at least 0.01.

3. The composition according to claim 1, wherein M is Y.

4. The composition according to claim 1, wherein A is Ba.

5. The composition according to claim 1, wherein D is Zn.

6. The composition according to claim 1, wherein Hal is F.

7. The composition according to claim 1, wherein x ranges from 0.02 to 1.5.

8. The composition according to claim 1, wherein y ranges from 0.04 to 0.36 and z ranges from 0.01 to 0.2.

9. A method for producing the composition for photoluminescence according to claim 1, the method comprising providing a raw material mixture of an M-source, an A-source, a D-source, a Hal-source and at least one of a Yb-source and an Rem-source, wherein M is at least one element selected from Y, Gd, La, Lu, In, Sc and Bi; A is at least one element selected from Ba, Sr and Ca; D is at least one element selected from Zn, Mg, Cu, Ni, Mn and Fe; Hal is at least one element selected from F, Cl, Br and I; and Rem is a rare earth element selected from Ce, Dy, Er, Eu, Ho, Nd, Pr, Sm, Tb and Tm;

grinding the raw material mixture to obtain a raw material powder mixture;

pre-annealing the raw material powder mixture at a temperature ranging from 1000° C. to 1300° C. to obtain a pre-annealed powder mixture; grinding the pre-annealed powder mixture to obtain a ground pre-annealed powder mixture; and annealing the ground pre-annealed powder mixture at a temperature ranging from 1000° C. to 1300° C. to obtain the composition for photoluminescence.

10. The method according to claim 9, wherein the M-source is an oxide of M, the A-source is a carbonate of A, the D-source is an oxide of D, the Hal-source is an halide of M, and the at least one of the Yb-source and the Rem-source is at least one of an oxide of Yb and an oxide of Rem.

11. A method for marking plastic parts comprising incorporating the composition of claim 1 into a plastic mixture;

molding the plastic mixture into a plastic parts; and sorting the plastic parts.

12. The method according to claim 11, wherein the photoluminescence process of the composition is a down-shifting process or an up-conversion process depending on the composition.

13. A plastic mixture comprising the composition of claim 1.

* * * * *